Sept. 29, 1964 W. BAASNER ETAL 3,150,559
PHOTOGRAPHIC REPRODUCTION APPARATUS
Original Filed Feb. 4, 1957 3 Sheets-Sheet 1

INVENTORS.
Wilhelm BAASNER  Ferdinand WAGNER
BY Michael S. Striker
agt.

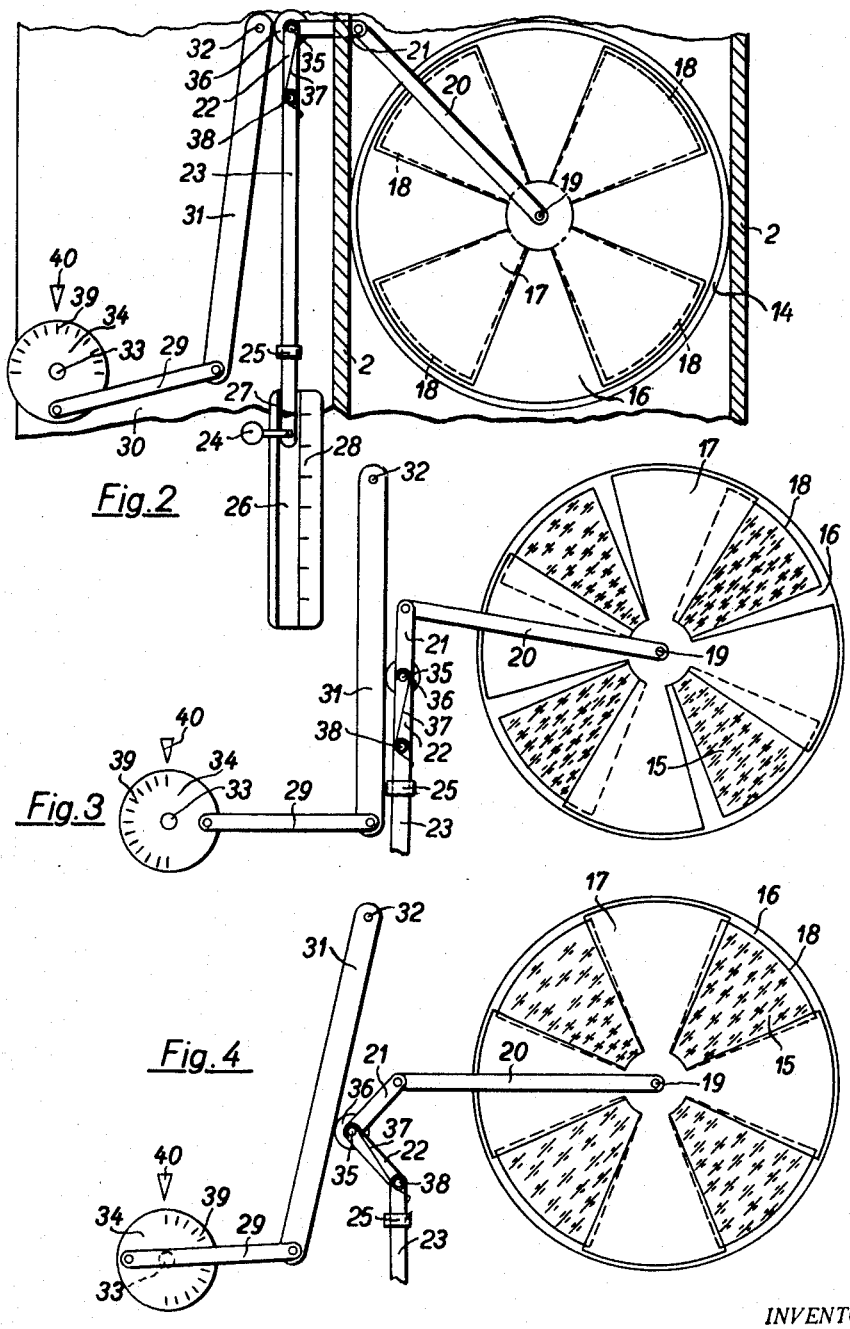

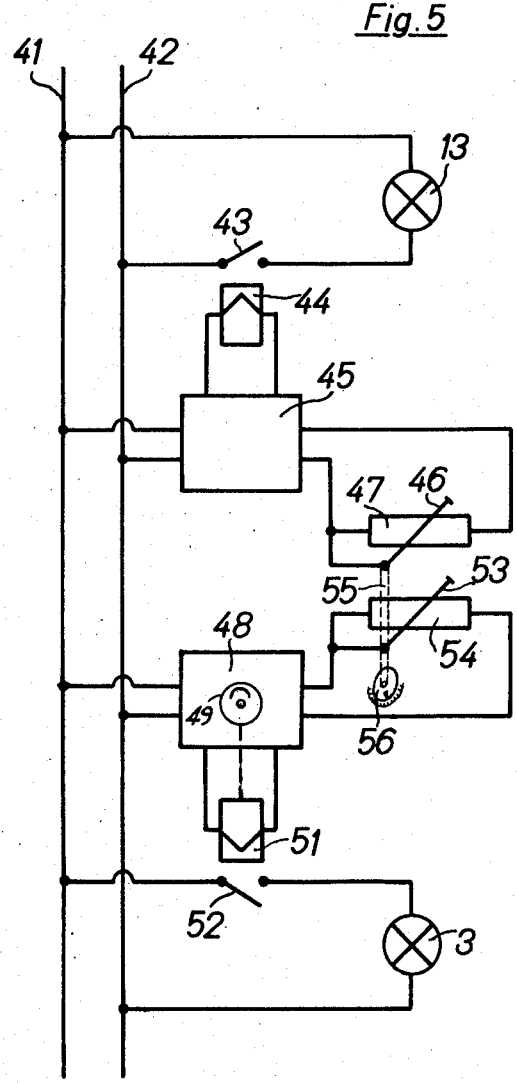

United States Patent Office 3,150,559
Patented Sept. 29, 1964

3,150,559
PHOTOGRAPHIC REPRODUCTION APPARATUS
Wilhelm Baasner and Ferdinand Wagner, Munich, Germany, assignors to Agfa Aktiengesellschaft, Leverkusen-Bayerwerk, Germany
Continuation of abandoned application Ser. No. 637,927, Feb. 4, 1957. This application Dec. 18, 1962, Ser. No. 246,654
Claims priority, application Germany Feb. 10, 1956
9 Claims. (Cl. 88—24)

The present application is a continuation of our co-pending patent application Serial No. 637,927, now abandoned, filed February 4, 1957, entitled "Photographic Reproduction Apparatus."

The present invention relates to a photographic reproduction apparatus such as an enlarger, for example.

One of the most important factors to be considered in making photographic reproductions is the degree of contrasts in the reproduction. This degree of contrast depends not only upon the characteristics of the transparency which is reproduced, but also upon the contrast characteristics of the copy paper.

It is known that the contrast characteristics of a light-sensitive copy sheet may be influenced by means of direct exposure of said sheet to light which has not passed through the transparency to be printed. This exposure takes place additionally to the printing exposure of said sheet to the light having passed through the transparency. So it is possible to use one type of printing paper for the printing of negatives with high and low contrasts. For example, the contrast characteristics of the printing paper used for all prints, may be of the type which is called "hard" and can be varied by the above-mentioned additional exposure so that they are equal to those contrast characteristics which are usually called "special," "soft," and so on.

The original contrast characteristics of different emulsions of printing papers may be different, so that it is very important to take into consideration this factor on determining the amount of additional light to be directed onto the printing paper.

Therefore one of the objects of the present invention is to provide an apparatus for making photographic reproductions in a manner which exposes the light sensitive sheet material on which the reproduction is made in accordance with at least one factor in addition to the degree of contrast desired.

Another object of the present invention is to expose a light sensitive sheet on which a photographic reproduction is made to light in accordance with the degree of contrast desired as well as in accordance with the contrast characteristics of the light sensitive sheet material.

A further object of the present invention is to provide an apparatus capable of accomplishing the above objects and also capable of exposing the light sensitive sheet to light in a manner which takes into consideration the light sensitivity of the light sensitive sheet.

An additional object of the present invention is to provide an apparatus capable of accomplishing all of the above objects and at the same time composed of simple and ruggedly constructed elements which are very reliable in operation.

With the above objects in view, the present invention mainly consists of a photographic reproduction apparatus which includes a means for directing light from a first light source through a transparency onto a light sensitive sheet. Another means is provided for directing light from a second light source onto the light sensitive sheet without passing through the transparency. A pair of adjusting means are provided for adjusting the degree to which the light sensitive sheet is exposed to light from the second light source in accordance with a pair of variable factors, respectively, one of which is the degree of contrast desired in the photographic reproduction made on the light sensitive sheet.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary sectional elevational view of a photographic enlarger having in it a means for exposing the light sensitive copy sheet to light in addition to that coming from the light passing through the transparency or negative carrying the photograph which is to be reproduced;

FIG. 2 is a fragmentary partly sectional elevational view of the structure of FIG. 1 taken in part along line II—II of FIG. 1 in the direction of the arrows, FIG. 2 being on an enlarged scale with respect to FIG. 1 and FIG. 2 showing a shutter for controlling the passage of light from an independent light source to the light sensitive copy sheet, this shutter being shown in its closed position in FIG. 2;

FIG. 3 shows part of the structure of FIG. 2 with the shutter thereof in a different position;

FIG. 4 shows part of the structure of FIG. 2 in still another position; and

FIG. 5 is a wiring diagram of the arrangement of the invention.

Figure 1:
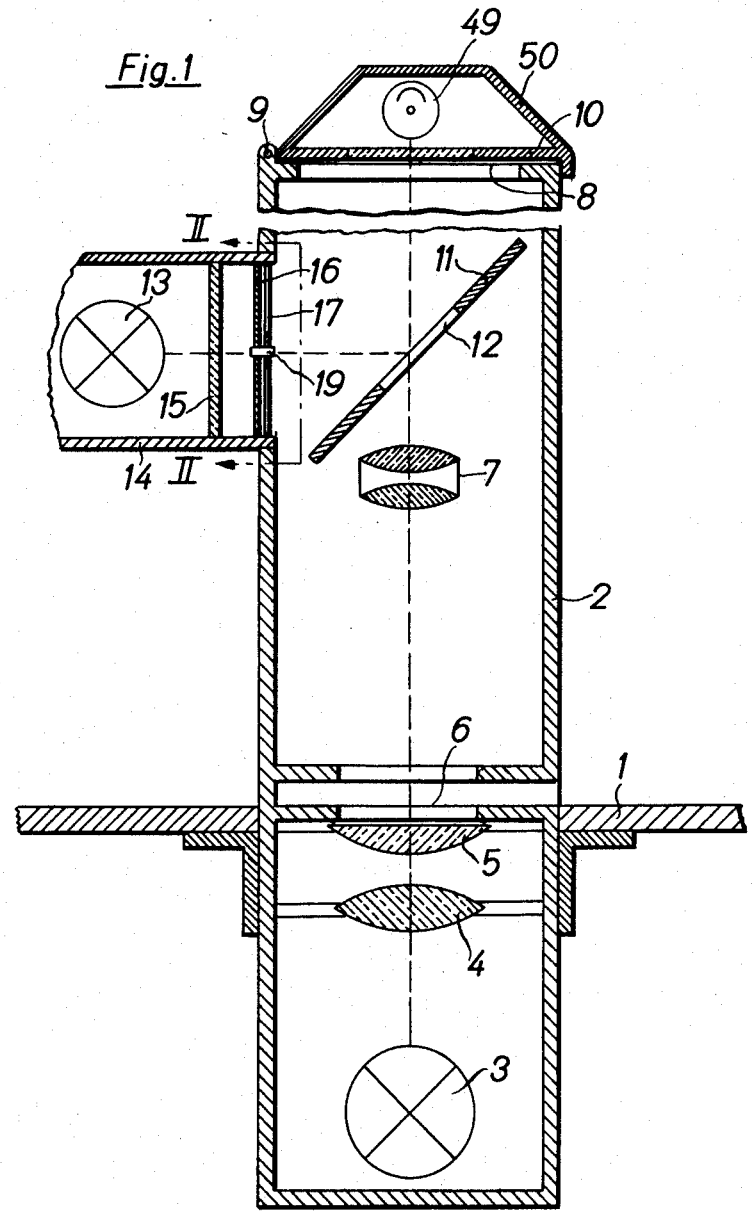

Referring now to FIG. 1 of the drawings, it will be seen that a base plate 1 carries in a suitable opening thereof an elongated enlarger housing 2 of a rectangular cross section. The individual elements of the enlarger are carried in the interior of the elongated housing 2, these elements being the light source 3, the condenser made up of the lenses 4 and 5, the negative or transparency carrier 6, the objective 7, and the support 8 for the light sensitive sheet material which forms the copy paper. This light sensitive sheet material preferably comes from a large supply roll located adjacent the supporting surface of the support 8, the light sensitive sheet material being located beneath a pressure member 10 which is pivotally carried by the housing 2 at 9.

A reflector 11 is located between the objective 7 and the plane in which the light sensitive copy material is located, this reflector 11 having an opening 12 through which the light from the light source 3 passes. The reflector 11 serves to direct light from a second light source 13 to the light sensitive sheet material on the support 8 in order to influence the contrast characteristics of this light sensitive sheet material with light which does not pass through the negative or transparency.

The light source 13 is located in a tubular member 14 which is fixed to and extends from the housing 2, and a light dispersing plate 15, which is not absolutely necessary, may be located within the tubular member 14. Furthermore, an adjustable means for controlling the passage of light from the light source 13 to the light sensitive sheet material is located between the light source 13 and the reflector 11 at the right end of the tube 14, as viewed in FIG. 1, and this adjustable means takes the form of a pair of shutter members 16 and 17 one of which is adjustable with respect to the other in order to control the passage of light from the light source 13 to the reflector 11 and from the latter to the light sensitive copy-sheet.

As is shown in greater detail in FIG. 2, the shutter element 16 is in the form of a stationary disc extending completely across the tubular member 14 and fixedly carried by the latter, and this stationary disc 16 is provided with a plurality of sector-shaped cutouts 18 distributed uniformly about the axis of the disc 16 and separated by sector-shaped portions of the disc 16, four cutouts 18 being shown in the illustrated example. The other shutter element 17 is coaxial with the shutter element 16 and has a central portion from which four sector-shaped portions extends radially, these sector-shaped portions being large enough to completely cover the cutouts 18 in the position of the shutter 16, 17 shown in FIG. 2, so that in this position no light passes from the light source 13 to the light sensitive copy sheet. The turnable disc 17 is turnably supported by a pin 19 fixedly carried by the disc 16, and the member 17 is fixed to an arm 20 which extends through a suitable slot in the wall of the tube 14 to the exterior thereof. This arm 20 is pivotally connected to a link 21 which is itself pivotally connected to a second link 22, the latter being pivotally connected to an elongated longitudinally shiftable bar 23 which is capable of being manually shifted.

The manually adjustable linkage means described above includes a manually engageable knob 24 which is fixed to the longitudinally shiftable bar 23, and this bar is guided for longitudinal shifting movement by a bearing 25 as well as by a guideway 26 formed in a scale member 28. The bar 23 carries an index 27 which cooperates with the graduations on the scale 28 to indicate to the operator the proper position for the bar 23, these graduations being, for example, "hard," "special," "soft," and the like. These are markings for printing paper graduations desired on photographic printing. A plate 30 is fixedly carried by the housing 2, and this plate 30 carries the bearing 25 and the scale 28 which has the bearing 26.

It will be noted that the above-described adjusting means is itself adjustable in accordance with the angles which the links 21 and 22 make with each other, and a second adjusting means for adjusting this first adjusting means is provided, this second adjusting means including an elongated guide member 31 which is pivotally supported by a pivot pin 32 carried by the plate 30. The elongated guide member 31 is pivotally connected to a link 29 which is in turn pivotally connected to a knob 34 which is turnable about a pin 33 fixedly carried by the plate 30. Thus, by turning the knob 34, the link 29 is shifted to control the angular position of the elongated guide member 31 with respect to the axis of the pivot pin 32.

The links 21 and 22 are pivotally connected to each other by a pivot pin 35 which turnably supports a guide roller 36 which rides along the right edge of the elongated guide bar 31, as viewed in FIGS. 2 to 4. A wire spring 37 is wound on the one hand about the pivot pin 38 interconnecting the link 22 with the bar 23 and on the other hand presses against the pivot pin 35 so as to urge the guide roller 36 toward and into engagement with the guide bar 31, so that the roller 36 rides on the guide bar during longitudinal shifting of the bar 23.

When the bar 23 has the position shown in FIG. 2 where the index 27 is in register with the uppermost mark of the scale 28, the shutter 16, 17 is fully closed, and thus the angle in which the guide bar 31 happens to be has no influence on the structure, since in this position of the parts the pivot pin 35 is at the same elevation as the pivot pin 32. If additional light is desired to influence the contrast of the light sensitive copy sheet, then the bar 23 is manually shifted downwardly and the index 27 is placed at one of the graduations of the scale 28 which indicates the desired degree of contrast. At the same time the shutter element 17 is turned due to its connection to the bar 23 through elements 20 to 22, and thus the cutouts 18 will be opened to a greater or lesser extent depending upon the position to which the bar 23 is moved by the operator.

When using a light sensitive sheet material of average contrast characteristics for the photographic reproduction, the knob 34 is turned so that a middle value of the scale 39 registers with the stationary index 40 carried by the plate 30, and in this position of the parts elements 29 and 31 have the position shown in FIG. 2. On the other hand, if the light sensitive sheet material which is used needs more or less additional light in order to attain a certain contrast, then by turning the knob 34 in a counterclockwise or clockwise direction, respectively, as viewed in FIG. 2, the angle between the bar 23 and the guide bar 31 can be decreased or increased, respectively. In accordance with the first of these examples, the knob 34 may be turned in a counterclockwise direction from the position of FIG. 2 to that of FIG. 3, and it will be noted that this turning of the knob 34 results in a turning of the guide bar 31 in a counterclockwise direction about the pivot pin 32, so that the guide bar 31 acts on the roller 35 in a manner which causes the angle between the links 21 and 22 to increase, and as a result the extent to which the cutouts 18 are uncovered is decreased. In the second example the knob 34 is turned in a clockwise direction from the position of FIG. 2 to that of FIG. 4, and this results in a turning of the guide bar 31 in a clockwise direction about the pivot pin 32, so that the spring 37 causes the angle between the links 21 and 22 to become smaller, and as a result the extent to which the openings 18 are uncovered is increased. The intensity of the additional light reaching the light sensitive sheet from the light source 13 is also correspondingly decreased or increased.

Thus, it will be seen that the adjusting means formed by the linkage 20–23 and the adjusting means formed by the parts 34, 29, 31 cooperate mutually one with the other in order to adjust the rates at which adjustments are made by these adjusting means. For example, the angular position of the guide bar 31 will control the rate at which adjustments are made during longitudinal movement of the bar 23. If the guide bar 31 has the position shown in FIG. 3, then obviously the rate of adjustment is less than where the guide bar 31 has the position shown in FIG. 4, for example, since in the case of FIG. 3 the angular movement of the link 20 will be determined solely by longitudinal movement of the bar 23 whereas in the case of FIG. 4, the angular movement of the link 20 will be determined not only by longitudinal movement of the bar 23 but also by the continuous movement of the roller 36 to the left, as viewed in FIG. 4, resulting in a continuous decrease of the angle between the links 21 and 22 as the bar 23 is moved downwardly, as viewed in FIG. 4, so that the movement of the link 20 is at a faster rate than in the case of FIG. 3 inasmuch as the link 20 moves, in the case of FIG. 4, in response to the change in the angle between the links 21 and 22 as well as in response to longitudinal movement of the bar 23. It is clear that the rate of change in the angle between the links 21 and 22 during longitudinal movement of the bar 23 will depend upon the angular position of the guide bar 31, so that in this way the adjusting means 34, 29, 31 adjusts the rate at which adjustments are made by the adjusting means 20 to 23. On the other hand, if the bar 23 has already been positioned, then the position of the linkage 20 to 23 will control the rate at which adjustments are made by the adjusting means 34, 29, 31, when the bar 31 turns angularly, as is apparent from a comparison of FIGS. 3 and 4. The closer the roller 36 is to the turning axis of the bar 31 provided by the pivot pin 32 the less will be the extent of adjustment for a given angular turning of the bar 31. Assuming that the bar 23 has the position shown in FIG. 4 and that the bar 31 has been turned from the position of FIG. 3 to that of FIG. 4, then it is clear that with the parts in the position of FIG. 4 the roller 36 will have moved to the left by a certain distance. However, if the bar 23 initially had a position higher than that shown in FIG. 4, then the same angular turning of the bar 31 from the position of FIG. 3 to that of FIG. 4 would have resulted in a lesser movement of the roller 36 to the left, as viewed in FIG. 4, so that it is clear that the adjustment provided by the adjusting means 20 to 23 also regulates the rate at which adjustments will be made by the adjusting means 34, 29, 31. In this way both of these adjusting means cooperate mutually one with the other for adjusting the rates at which adjustments are made by these adjusting means.

In order to accurately adapt the apparatus for use with the contrast characteristics of different emulsions of light sensitive copy sheets, it may be desirable under some circumstances to provide the guide bar 31 with a curved edge along which the roller 36 rides, or the pivot pin 32 of the guide bar 31 may be shifted in a direction parallel to the longitudinal axis of the bar 23 together with a corresponding lengthening of the guide bar 31. Furthermore, instead of supporting the guide bar 31 for turning movement, it may be supported for movement in a direction transverse to its length. In this latter case, stationary guides may be arranged on the plate 30 instead of the pivot 32 so that the guide roller 36 may take the position shown in FIG. 2 irrespective of the position of the member 31, when the index 27 of the bar 23 is in registry with the uppermost graduations of the scale 28, in which position no additional light is desired.

Instead of the sector-type shutter 16, 17, it is of course possible to use different types of shutters or other elements which influence the additional light, such as, for example, gray wedges or adjustable resistances in the circuit of the lamp 13.

In order to adapt the amount of additional light which reaches the light sensitive copy sheet to the particular light sensitivity of the copy paper which happens to be used, the same shutter arrangement may be used, for example, in such a way that the lower end of the bar 23 is again connected to a control linkage system corresponding to the elements 21, 22, 23, 31, 36. Instead, allowance may be made for the sensitivity of the copy paper by varying the duration of the exposure of the copy paper by the additional light.

This latter type of control is illustrated by the wiring diagram of FIG. 5. To the lines 41 and 42 is connected the additional light source 13 which is energized by current received from the lines 41 and 42, and the switch 43 in the circuit of the lamp 13 is actuated by a relay 44 of an electronic timing device 45 which is of a known construction. The period of operation of the timing device may be regulated by adjusting the adjustable element 46 of the variable resistor 47, in accordance with the particular sensitivity of the light sensitive sheet which happens to be used at any given time.

Also, the reproduction apparatus may include a known device 48 for automatically regulating the exposure of the copy sheet to light. This device includes the photoelectric cell 49 (FIG. 1) which is located within the housing 50 of the pressure means 10 which presses on the copy sheet. The relay 51 of the exposure control device 48 is energized during the exposure time controlled by the device 48, and actuates the switch 52 in the circuit of the lamp 3 so as to close this circuit at the beginning of the exposure and to open this circuit when a predetermined amount of light from the lamp 3 and the lamp 13 has passed through the light sensitive reproduction sheet and has reached the photoelectric cell 49. This latter amount of light also may be regulated by adjusting the position of an adjustable member 53 of a variable resistor 54 in accordance with the particular light sensitivity of the reproduction sheet. The shiftable resistor adjusting elements 46 and 53 are connected together for turning movement about a common axis by the rod 55 which is connected to both of the members 46 and 53 and which is supported for turning movement about its own axis, and a single knob 56 fixed to the shaft 55 to enable the operator to manually turn the latter, so that both the elements 46 and 53 are simultaneouslby adjusted by the single adjusting element 56 which is common to the members 46 and 53.

It will be understood that each of the elements described above, or two or more together, may also find a useful application in other types of photographic reproduction apparatus differing from the types described above.

While the invention has been illustrated and described as embodied in adjustable photographic reproduction apparatus, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a photographic reproducing apparatus, in combination, means for directing light from a first light source through a transparency onto a light sensitive sheet; means for directing light from a second light source onto the light sensitive sheet without passing through the transparency; adjustable light limiting means cooperating with said second light source for regulating the amount of light received by said sheet from said second light source; first adjusting means operatively connected to said adjustable light limiting means for setting the latter in accordance with the degree of contrast desired in the photographic reproduction made on the light sensitive sheet, said first adjusting means being separately adjustable; and second adjusting means cooperating with said first adjusting means for adjusting the later in accordance with the contrast characteristics of the light sensitive sheet so that the setting of said adjustable light limiting means is determined by both said first and said second adjusting means, said first and second adjusting means cooperating mutually one with the other for adjusting the rates at which adjustments are made by said first and second adjusting means.

2. In a photographic reproducing apparatus, in combination, means for directing light from a first light source through a transparency onto a light sensitive sheet; means for directing light from a second light source onto the light sensitive sheet without passing through the transparency; adjustable shutter means cooperating with siad second light source for regulating the amount of light received by said sheet from said second light source in accordance with the setting of said shutter means; first adjusting means operatively connected to said shutter means for setting the latter in accordance with the degree of contrast desired in the photographic reproduction made on the light sensitive sheet, said first adjusting means being separately adjustable; and second adjusting means cooperating with said first adjusting means for adjusting the latter in accordance with the contrast characteristics of the light sensitive sheet so that the setting of said shutter means is determined by both said first and said second adjusting means, said first and second adjusting means cooperating mutually one with the other for adjusting the rates at which adjustments are made by said first and second adjusting means.

3. In a photographic reproducing apparatus, in combination, means for directing light from a first light source through a transparency onto a light sensitive sheet; means for directing light from a second light source onto the light sensitive sheet without passing through the transparency; adjustable light limiting means cooperating with said second light source for regulating the amount of light received by said sheet from said second light source; and adjusting means for said adjustable light limiting means for adjusting the same in accordance with two variables— namely, on the one hand, the degree of contrast desired in the photographic reproduction to be made on the light sensitive sheet, and on the other hand, the contrast characteristics of the light sensitive sheet itself, said adjusting means including first adjusting means operatively connected to said adjustable light limiting means for setting the latter in accordance with variations of one of said variables, said first adjusting means being separately adjustable, and second adjusting means cooperating with said first adjusting means for adjusting the latter in accordance with variations of the other of said variables so that the setting of said adjustable light limiting means is determined by both said first and second adjusting means in combination, said first and second adjusting means cooperating mutually one with the other for adjusting the rates at which adjustments are made by said first and second adjusting means.

4. In a photographic reproducing apparatus, in combination, means for directing light from a first light source through a transparency onto a light sensitive sheet; means for directing light from a second light source onto the light sensitive sheet without passing through the transparency, said latter means including a light guiding tube along which light passes from said second light source toward the transparency; a pair of plate members each having a central portion and a plurality of substantially sector-shaped portions extending radially from and distributed uniformly about said central portion, and said plate members being turnable one with respect to the other between a fully opened position where said sector-shaped portions of said plate members are in substantial registry and a fully closed position where said substantially sector-shaped portions of said one plate member respectively cover the spaces between the sector-shaped portions of the other plate member; manually operable linkage means operatively connected to said one plate member for turning the latter, said linkage means including a pair of pivotally interconnected links and a spring means acting on said links for changing the angle therebetween, so that when said angle changes said one plate member will be turned through a distance dependent upon the angle change between said links; and adjustable guide means limiting the extent to which said spring means changes said angle, said manually operable linkage means and said adjustable guide means cooperating with each other for adjusting the degree to which the light sensitive sheet is exposed to light from said second light source in accordance with a pair of variable factors, respectively, one of which is the degree of contrast desired in the photographic reproduction made on the light sensitive sheet and the other of which is the contrast characteristics of the light sensitive sheet.

5. In a photographic reproducing apparatus according to claim 4, a roller turnably carried by said pair of links at the pivotal connection therebetween, said adjustable guide means including a manually shiftable bar along which said roller rides during manual actuation of said linkage means.

6. In a photographic reproducing apparatus, in combination, means for directing light from a first light source through a transparency onto a light sensitive sheet; means for directing light from a second light source onto the light sensitive sheet without passing through the transparency; adjustable means for regulating the amount of light received by said sheet from said second light source; first adjusting means operatively connected to said adjustable means for setting the latter in accordance with the degree of contrast desired in the photographic reproduction made on the light sensitive sheet, said first adjusting means being separately adjustable; and second adjusting means cooperating with said first adjusting means for adjusting the latter in accordance with the contrast characteristics of the light sensitive sheet so that the setting of said adjustable means is determined by both said first and second adjusting means in combination, said first and second adjusting means cooperating mutually one with the other for adjusting the rates at which adjustments are made by said first and second adjusting means.

7. In an apparatus according to claim 6, light duration controlling means for controlling the length of time during which the light sensitive sheet receives light from said second light source, in accordance with the sensitivity of the light sensitive sheet.

8. In an apparatus as recited in claim 7, means coupled with said light duration controlling means and operating simultaneously therewith for controlling the extent to which the light sensitive sheet is exposed to light from said first light source in accordance with the sensitivity of the light sensitive sheet.

9. In a photographic reproducing apparatus, in combination, means for directing light from a first light source through a transparency onto a light-sensitive sheet; means for directing a light from a second light source onto the light-sensitive sheet without passing through the transparency; first adjustable means operatively connected to said second light source for adjusting the amount of light directed to the sheet from said second light source in accordance with the degree of contrast desired; and second adjusting means coupled with and operable simultaneously with said first adjusting means for controlling the extent to which the light-sensitive sheet is exposed to light from both light sources in accordance with the sensitivity of the light-sensitive sheet.

References Cited in the file of this patent

UNITED STATES PATENTS

| 2,186,619 | Sauer | Jan. 9, 1940 |
| 2,219,116 | Sauer | Oct. 22, 1940 |
| 2,352,914 | Rackett | July 4, 1944 |
| 2,480,422 | Simmon | Aug. 30, 1949 |
| 2,491,018 | Thomas | Dec. 13, 1949 |
| 2,641,963 | Carter | June 16, 1953 |
| 2,853,921 | Biedermann et al. | Sept. 30, 1958 |

FOREIGN PATENTS

| 539,172 | Belgium | July 15, 1955 |